United States Patent
Reese et al.

(10) Patent No.: US 10,840,713 B2
(45) Date of Patent: *Nov. 17, 2020

(54) CHARGER, CHARGE INDICATOR, AND ASSOCIATED METHODS

(71) Applicant: TRANSFORM SR BRANDS LLC, Hoffman Estates, IL (US)

(72) Inventors: Brian Todd Reese, St. Charles, IL (US); Mark Good, Cary, IL (US); David Pozgay, Wilmette, IL (US); Tom Arvia, Gilberts, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,952

(22) Filed: Oct. 12, 2018

(65) Prior Publication Data

US 2019/0044349 A1  Feb. 7, 2019

Related U.S. Application Data

(63) Continuation of application No. 15/355,345, filed on Nov. 18, 2016, now Pat. No. 10,128,668.

(60) Provisional application No. 62/402,520, filed on Sep. 30, 2016, provisional application No. 62/410,142, filed on Oct. 19, 2016.

(51) Int. Cl.
*H02J 7/00* (2006.01)
*H02J 7/35* (2006.01)

(52) U.S. Cl.
CPC .......... *H02J 7/0021* (2013.01); *H02J 7/0018* (2013.01); *H02J 7/0027* (2013.01); *H02J 7/0044* (2013.01); *H02J 7/007* (2013.01); *H02J 7/35* (2013.01)

(58) Field of Classification Search
CPC ....... Y02E 60/12; H01M 10/46; H02J 7/0042; H02J 7/0044; H02J 7/0045
See application file for complete search history.

(56) References Cited

U.S. PATENT DOCUMENTS 5,159,258 A    10/1992   Kolvites et al.
7,521,890 B2 *  4/2009   Lee ........................ H02J 5/005
                                                        320/108
(Continued)

FOREIGN PATENT DOCUMENTS

EP          2670017          12/2013

OTHER PUBLICATIONS

International Preliminary Report on Patentability for PCT/US2017/051103, dated Apr. 11, 2019, 7 pages.

(Continued)

*Primary Examiner* — Arun C Williams
(74) *Attorney, Agent, or Firm* — McAndrews, Held & Malloy, Ltd.

(57) ABSTRACT

A system and method for charging battery packs is provided. The system may include a charging pad comprising a power supply, a charging pad surface, and a microcontroller unit. The power supply may provide charging power. The charging pad surface may include a first charging region and a second charging region. The microcontroller unit may control delivery of charging power to the first charging region and the second charging region such that a device placed on the first charging region is given a higher charging priority than a device placed on the second charging region.

17 Claims, 19 Drawing Sheets

(56) References Cited

U.S. PATENT DOCUMENTS

| | | | |
|---|---|---|---|
| 7,683,572 B2 | 3/2010 | Toya | |
| 9,160,180 B2* | 10/2015 | Suzuki | H02J 7/0013 |
| 2006/0164038 A1 | 7/2006 | Demers et al. | |
| 2007/0194526 A1 | 8/2007 | Randall | |
| 2008/0074085 A1 | 3/2008 | Chang | |
| 2009/0021218 A1* | 1/2009 | Kelty | B60L 3/0092 |
| | | | 320/137 |
| 2009/0236140 A1 | 9/2009 | Randall | |
| 2009/0278494 A1 | 11/2009 | Randall | |
| 2009/0302801 A1 | 12/2009 | Katsunaga | |
| 2013/0193906 A1 | 8/2013 | Yu | |
| 2014/0035379 A1 | 2/2014 | Stevens et al. | |
| 2016/0181860 A1 | 6/2016 | Partovi et al. | |

OTHER PUBLICATIONS

"Fli Charge Review—Best Wireless Power Charger Device", dated Oct. 17, 2016, 6 pages.

Extended European Search Report for EP17857184, dated Feb. 13, 2020, 7 pages.

* cited by examiner

CHARGER, CHARGE INDICATOR, AND ASSOCIATED METHODS

CLAIM OF PRIORITY

This patent application claims benefit from United States Provisional Patent Application Ser. No. 62/402,520, filed on Sep. 30, 2016 and claims benefit from United States Provisional Patent Application Ser. No. 62/410,142, filed on Oct. 19, 2016. The above stated applications are hereby incorporated herein by reference in their entirety.

FIELD OF THE DISCLOSURE

The present disclosure generally relates to rechargeable batteries and the chargers and methods used to recharge such batteries.

BACKGROUND

Constellation/dots style conductive charging is a charging technology that relies on the contact between small metallic ball tips on a battery and charged metallic strips on a charger. Existing conductive charging technology has been implemented in cell phones, tablets, and consumer electronics, for example. Constellation/dot style conductive charging has not yet been commercially implemented on power tools due to a number of challenges. For example, conductive charging may not operate properly in a garage, outdoor, and construction site environment that power tools are subjected to because the contacts of the charging device may get dirty. If a ball tip were to get dirty, sufficient electrical contact may not be made between the two elements.

As another example, power tool batteries continue to increase in both voltage and capacity; however, conductive charging pads are typically set to be charged at low voltage to reduce the risk of user injury. With this low voltage pad surface requirement, the system is forced into a number of compromises. First, higher voltage/capacity batteries may require a higher voltage differential or amperage draw than the small ball tips are capable of conducting due to the limited contact area. Second, additional circuitry is typically needed within the battery pack for higher voltages to step up the voltage so that the battery can be charged.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Shown in and/or described in connection with at least one of the figures, and set forth more completely in the claims are systems and methods for charging rechargeable batteries and/or for providing status information regarding a charging state of such rechargeable batteries.

These and other advantages, aspects and novel features of the present disclosure, as well as details of illustrated embodiments thereof, will be more fully understood from the following description and drawings.

DETAILED DESCRIPTION

Figure 1:
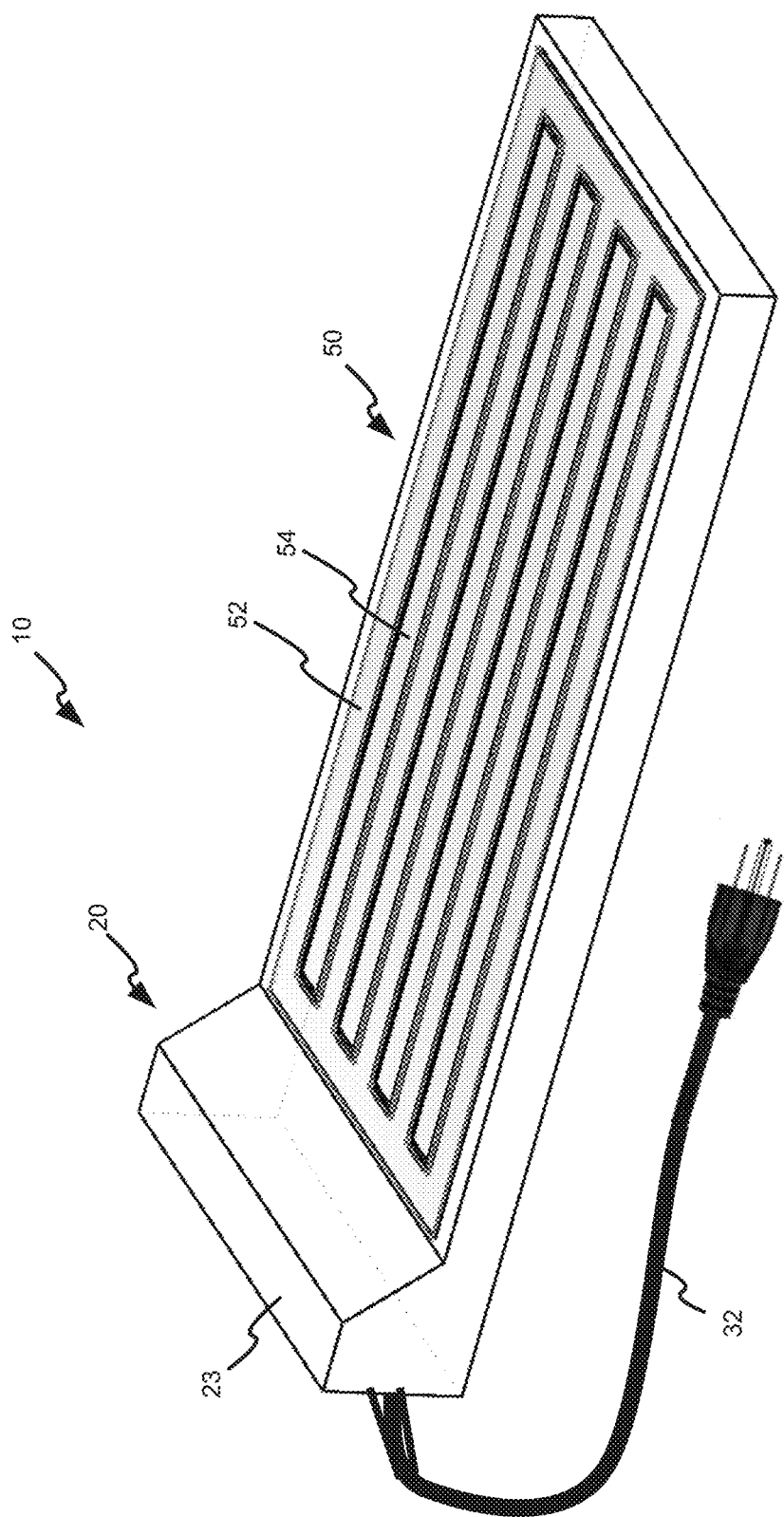
FIG. 1 provides a perspective view of an exemplary battery charging system, in accordance with a representative embodiment of the present disclosure.

The following discussion presents various aspects of the present disclosure by way of one or more examples. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., layer thickness, width, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Aspects of the present disclosure are related to systems and methods for charging battery packs. More specifically, certain embodiments of the present disclosure relate to systems and methods that provide constellation/dots style conductive charging having multiple terminal constellations for one or both of providing redundancy in the case of dirty or non-working contacts and providing a voltage/amperage divide for handling higher voltage and/or increased capacity battery packs.

Aspects of the present disclosure are also related to integrating a power supply within a charging pad of the charging system. Integrating the power supply adaptor within the charging pad may eliminate the need for a separate power supply external to the recharging system. Such integration may increase durability and/or utility of the charging pad and charging system, thus rendering the charging system more suitable for harsh and/or dirty environments associated with power tool usage.

A representative embodiment of the present disclosure provides multiple sets of the ball tip constellations on a battery, power tool, or other device. The ball tip constellations may provide either redundancy in the case of a dirty contact and/or a voltage/amperage divide in the case of the larger packs. For example, by duplicating the dot sets the risk of a device not charging when on a charging pad due to faulty, dirty, or damaged dot constellations is reduced. As another example, by adding additional dot sets, the current can be divided by the number of dot sets thus decreasing it to a reasonable range without increasing the charge time required. Additionally and/or alternatively, adding multiple constellations to the device provides options for positioning or placing the device on a charging pad. For example, dots/constellation on the top surface and bottom surface of the device enable the device to be placed on a charging mat without regard to which surface is touching the pad, since both surfaces have constellations. In various embodiments, the battery pack may be broken down into smaller groups of cells at lower series sum voltages to enable charging pad voltage to remain lower than the total series sum voltage of the multi-cell battery pack. The broken down battery pack addresses the safety issue of retaining low voltage surfaces on the charging pad and eliminates the need for modulating voltage up to a level needed to charge higher series sum battery voltages.

As utilized herein, the terms "exemplary" or "example" means serving as a non-limiting example, instance, or illustration. As utilized herein, the term "e.g." introduces a list of one or more non-limiting examples, instances, or illustrations.

Figure 2:
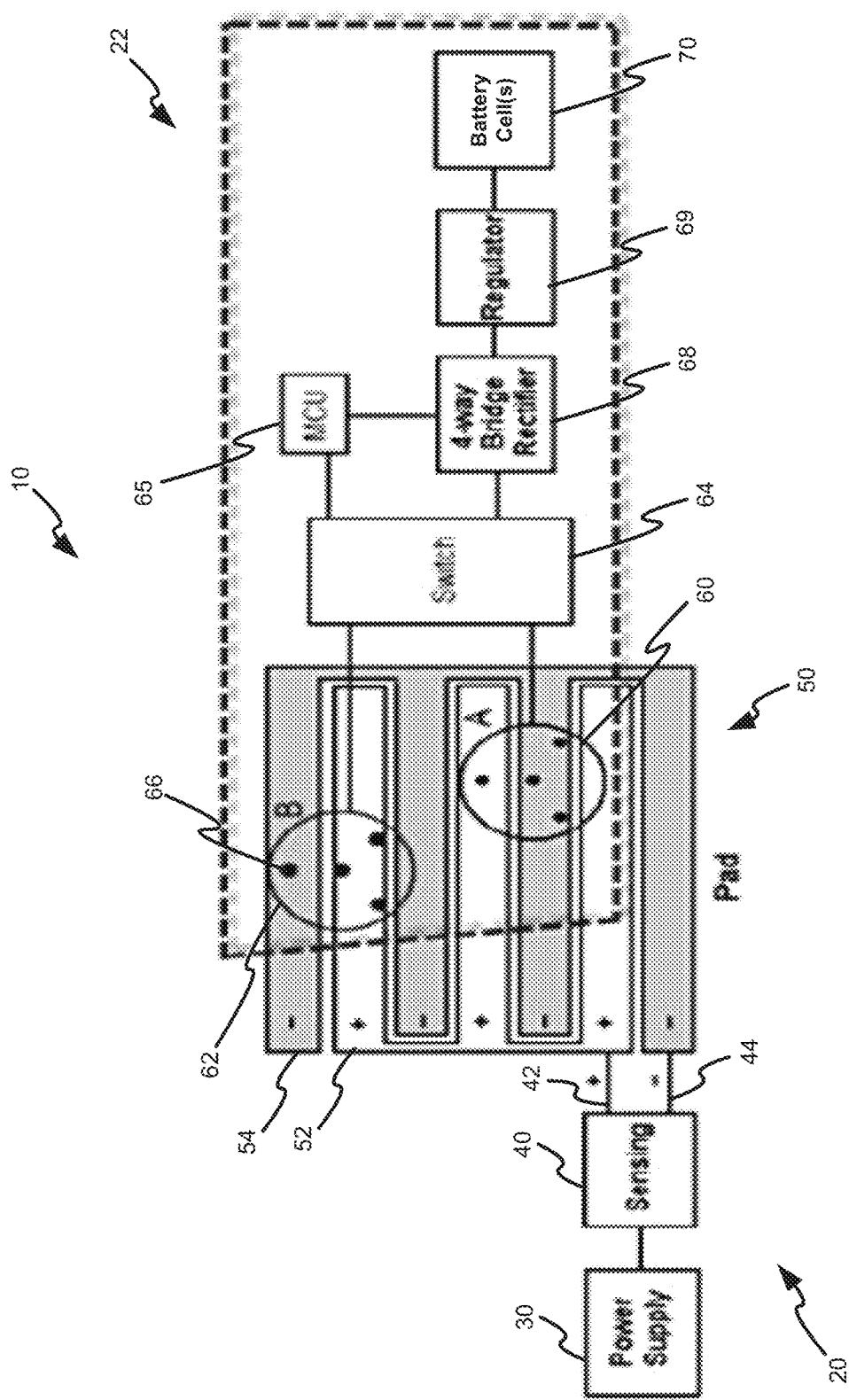
FIG. 2 provides a block diagram of the exemplary battery charging system of FIG. 1.

Referring now to FIGS. 1 and 2 a charging system 10 is shown, in accordance with a representative embodiment of the present disclosure. The charging system 10 may include a charging pad 20 and a rechargeable device 22. The charging pad 20 may comprise an AC power supply 30, a sensing circuit 40, and a charging pad surface 50. The rechargeable device 22 may include multiple terminal constellations 60, 62, a switch 64, a microcontroller unit (MCU) 65, a rectifier 68, a regulator 69, and one or more rechargeable battery cells 70. The power supply 30 may receive power from an AC wall outlet via a power cord 32. Moreover, the power supply 30 may be housed within a casing or housing 23 of the charging pad 20. Encasing the power supply 30 within the housing 23 may help protect the power supply from harsh environments. Moreover, such encasing may increase usability and convenience since a user of such a charging system 10 is not required to handle and maintain an external power supply.

The sensing circuit may condition power provided by the power supply 30 and provide such conditioned power to electrodes 52, 54 of the charging pad surface 50. The electrodes 52, 54 may comprise metal strips on the charging pad surface 50 that are respectively coupled to positive and negative power terminals 42, 44 of the sensing circuit 40. The multiple terminal constellations 60, 62 of the rechargeable device 22 may each have a pattern of contact points 66, such as small metallic ball tips or any suitable contact point. In particular, the electrodes 52, 54 and the contact points 66 of the constellations 60, 62 are geometrically arranged such that at least one contact point 66 of each constellation 60, 62 contacts the positive electrode 52 of the charging pad surface 50 and at least one contact point 66 of each constellation 60, 62 contacts the negative electrode 54 of the charging pad surface 50 irrespective of where each of the constellations 60, 62 is placed on the charging pad surface 50. In this manner, the contact points 66 of each of the terminal constellations 60, 62 makes a direct electrical connection to the electrodes 52, 54 when placed on the charging pad surface 50.

In various embodiments, the multiple terminal constellations 60, 62 may be wired together inside the device 22. Additionally and/or alternatively, the switch 64 may select from which of the terminal constellation 60, 62 to charge the device 22. The MCU 65 unit may include a processor and a memory that is in communication with the processor. The processor may execute instructions stored in the memory to determine a connection strategy and to control the switch 64. The switch 64 may provide charge signals received from one or more multiple terminal constellations 60, 62 to the rectifier 68, such as a four-way bridge rectifier. Because it is not possible to know which contact point(s) 66 of each of the constellations 60, 62 will contact the positive electrode 52 and which contact point(s) 66 of each of the constellations 60, 62 will contact the negative electrode 54, the rectifier 68 may be used to receive power signals from the contact point(s) with an unknown polarity and provide the regulator 69 with power signals of a desired polarity. The regulator 69 may regulate the power received from the rectifier 68 and provide the regulated output to the rechargeable battery cells 70.

Figure 3:
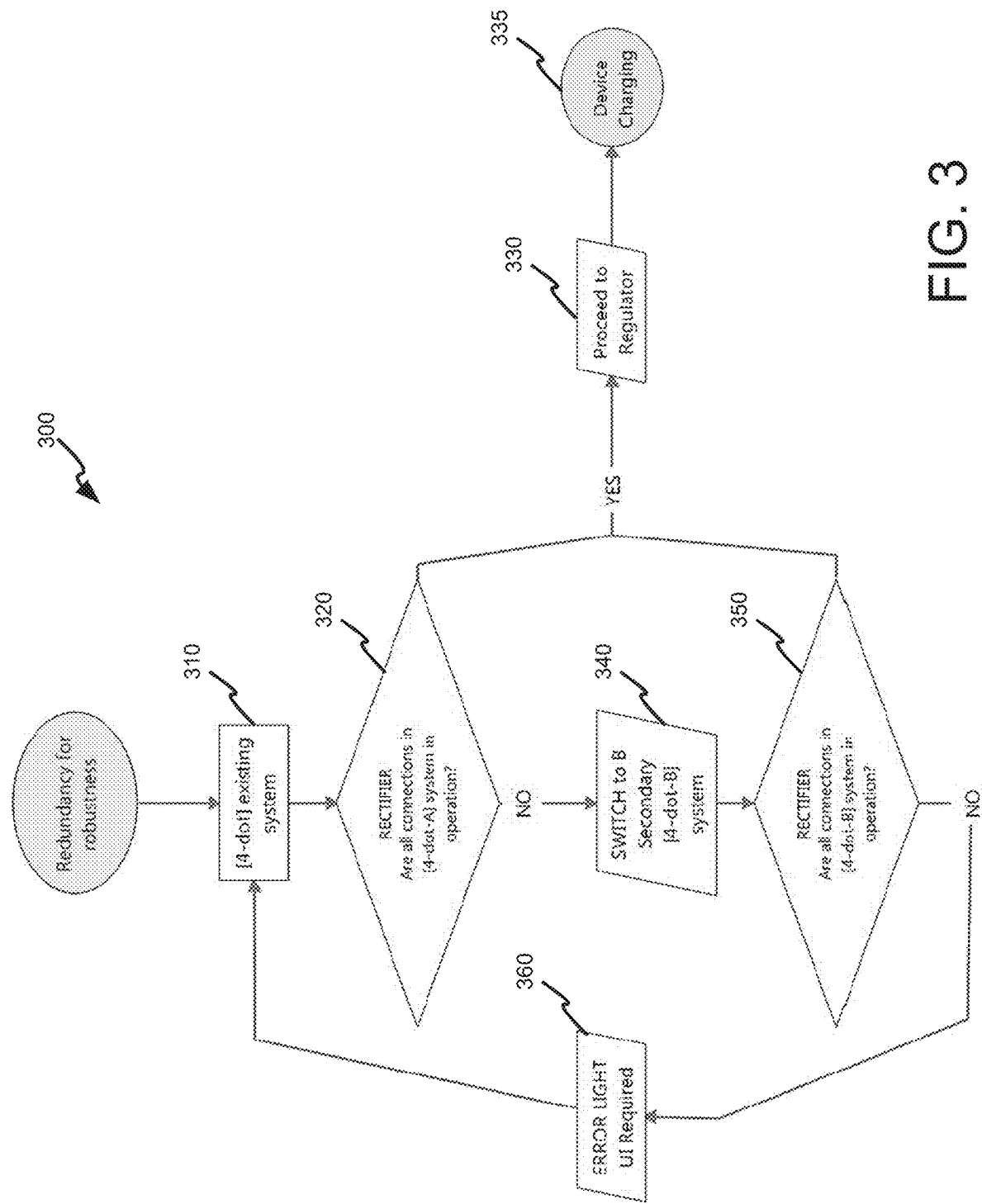
FIG. 3 is a flowchart illustrating an exemplary method for charging a battery of a device having multiple terminal constellations, in accordance with a representative embodiment of the present disclosure.

FIG. 3 is a flowchart illustrating an exemplary method 300 for charging battery cells 70 of a device 22 having multiple terminal constellations 60, 62, in accordance with a representative embodiment of the present disclosure. The actions of the method of FIG. 2 may be performed using elements of the system 10 of FIGS. 1 and 2 including, for example, the power supply 30, the sensing circuit 40, the charging pad surface 50, the multiple terminal constellations 60, 62, the switch 64, the MCU 65, the rectifier 68, the regulator 69, and rechargeable battery cell(s) 70. The system 10 may be arranged to provide redundancy, for example. Certain embodiments of the present disclosure may omit one or more of the actions, and/or perform the actions in a different order than the order listed, and/or combine certain of the actions discussed below. For example, some actions may not be performed in certain embodiments of the present disclosure. As a further example, certain actions may be performed in a different temporal order, including simultaneously, than listed below.

Initially, multiple terminal constellations 60, 62 of a device 22 may be placed on the charging pad surface 50 to make a direct electrical connection between the contact points 66 of the multiple terminal constellations 60, 62 and the pad electrodes 52, 54. The multiple terminal constellations 60, 62 may comprise a primary terminal constellation set and a secondary redundant terminal constellation set. The switch 64 may be controlled by MCU 65 to receive charging signal(s) from the primary terminal constellation set.

Next, the switch 64 at 310 may provide the received charging signal(s) to the rectifier 68. The MCU 65 at 320 may monitor the rectifier 68 to determine whether the contact points 66 of the primary terminal constellation set are operational. If the connections of the primary terminal constellation set are operational, the rectifier 68 at 330 may right the polarity of the received charging signals and may provide positive and negative power signals to the regulator 69. The regulator 69 at 335 may then charge the rechargeable battery cells 70 with its regulated output.

If the contact points 66 of the primary terminal constellation set are not operational at 320, the MCU 65 at 340 may control the switch 64 to receive charging signals from the secondary redundant terminal constellation set. Then, the switch 64 may provide the charging signals from the secondary redundant terminal constellation to the rectifier 68. The MCU 65 at 350 may monitor the rectifier 68 to determine whether the contact points 66 of the secondary redundant terminal constellation set are operational. If the connections of the secondary redundant terminal constellation set are operational, the rectifier 68 at 330 may right the polarity of the charging signals and may provide positive and negative power signal to the regulator 68. The regulator 68 at 335 may charge the rechargeable battery cells 70 with its regulated output. If the connections of the secondary redundant terminal constellation set are not operational, the MCU 65 at 360 may provide a notification. For example, the MCU 65 may illuminate an error light, may sound an alarm, and/or may display a message, in order to notify a user that the charging system 10 is not operational.

Figure 4:
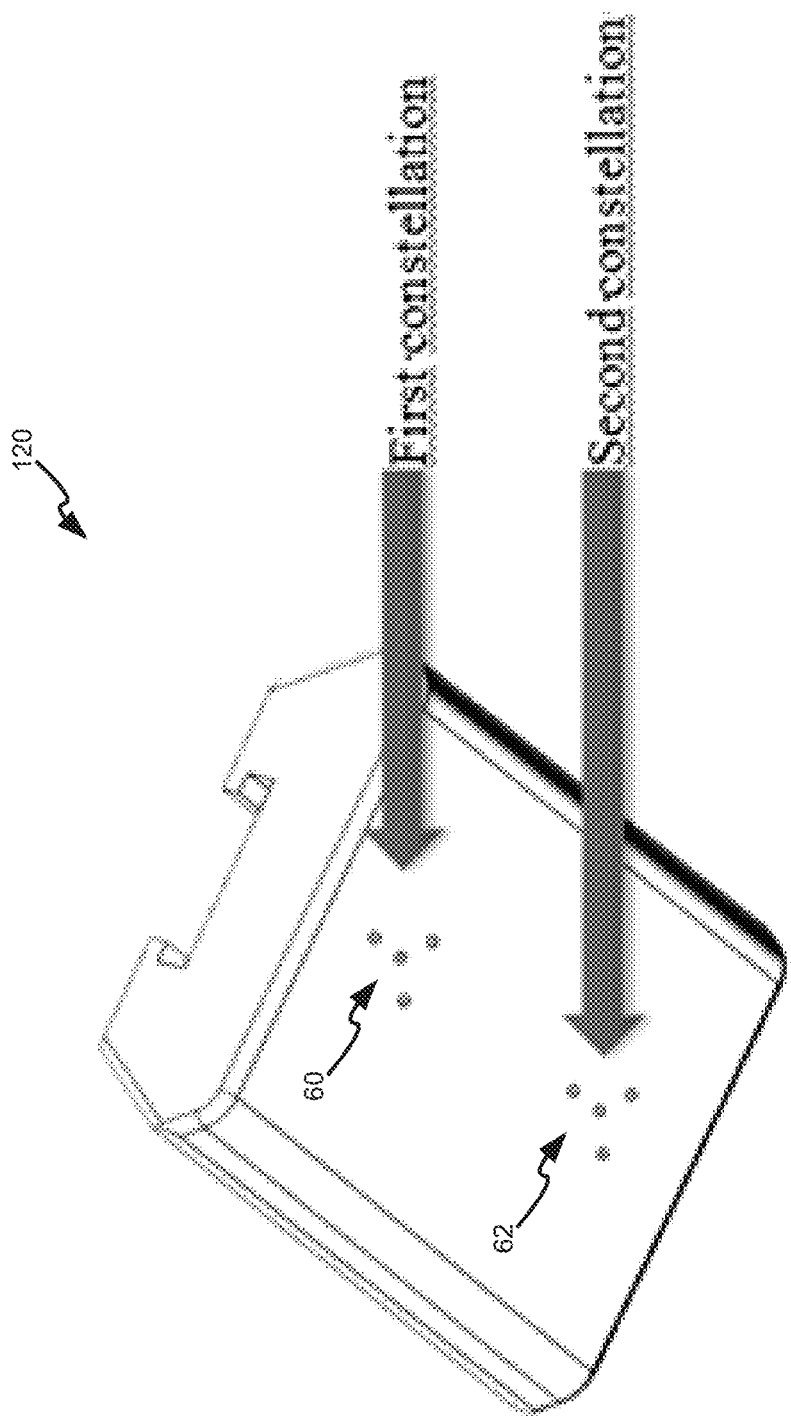
FIG. 4 is a bottom perspective view of an exemplary battery pack having multiple terminal constellations, in accordance with a representative embodiment of the present disclosure.

FIG. 4 is a bottom perspective view of an exemplary battery pack 120 having multiple terminal constellations 60, 62, in accordance with a representative embodiment of the present disclosure. As illustrated in FIG. 3, first and second dot constellation sets are provided for convenience.

Figure 5:
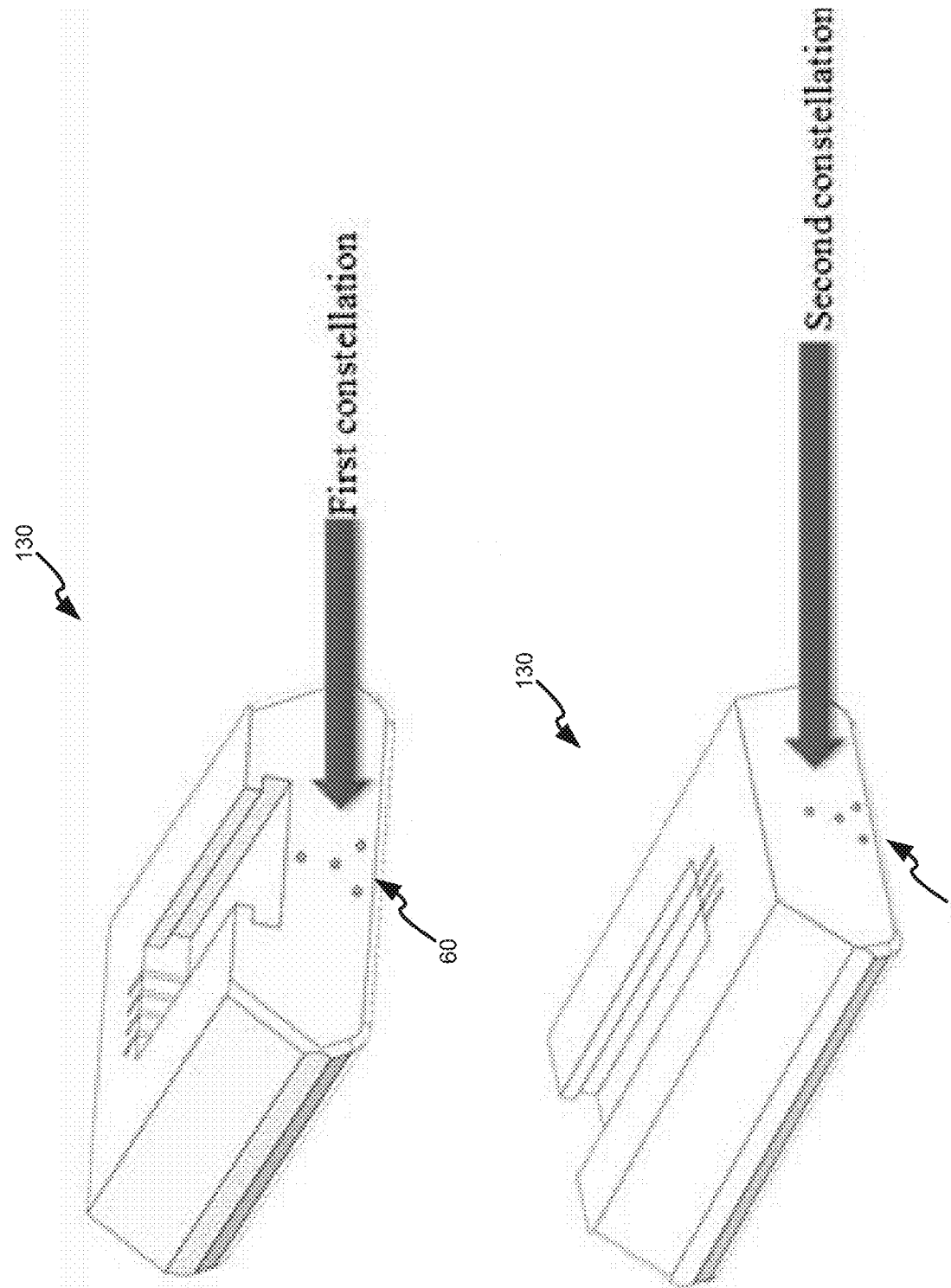
FIG. 5 illustrates front and rear perspective views of an exemplary battery pack having multiple terminal constellations, in accordance with a representative embodiment of the present disclosure.

FIG. 5 illustrates front and rear perspective views of an exemplary battery pack 130 having multiple terminal constellations 60, 62, in accordance with a representative embodiment of the present disclosure. Referring to FIG. 5, one or more terminal constellations 60, 62 may be provided, for example, on a front and a rear of the battery pack 130. In various embodiments, depending on the geometry of the battery pack 130, additional dot sets may be provided on different faces of the battery pack 130 so that each of the different faces of the battery pack 130 may be placed on the charging pad surface 50 in a manner that electrically connects respective contact points 66 to electrodes 52, 54 of the surface 50.

Figure 6:
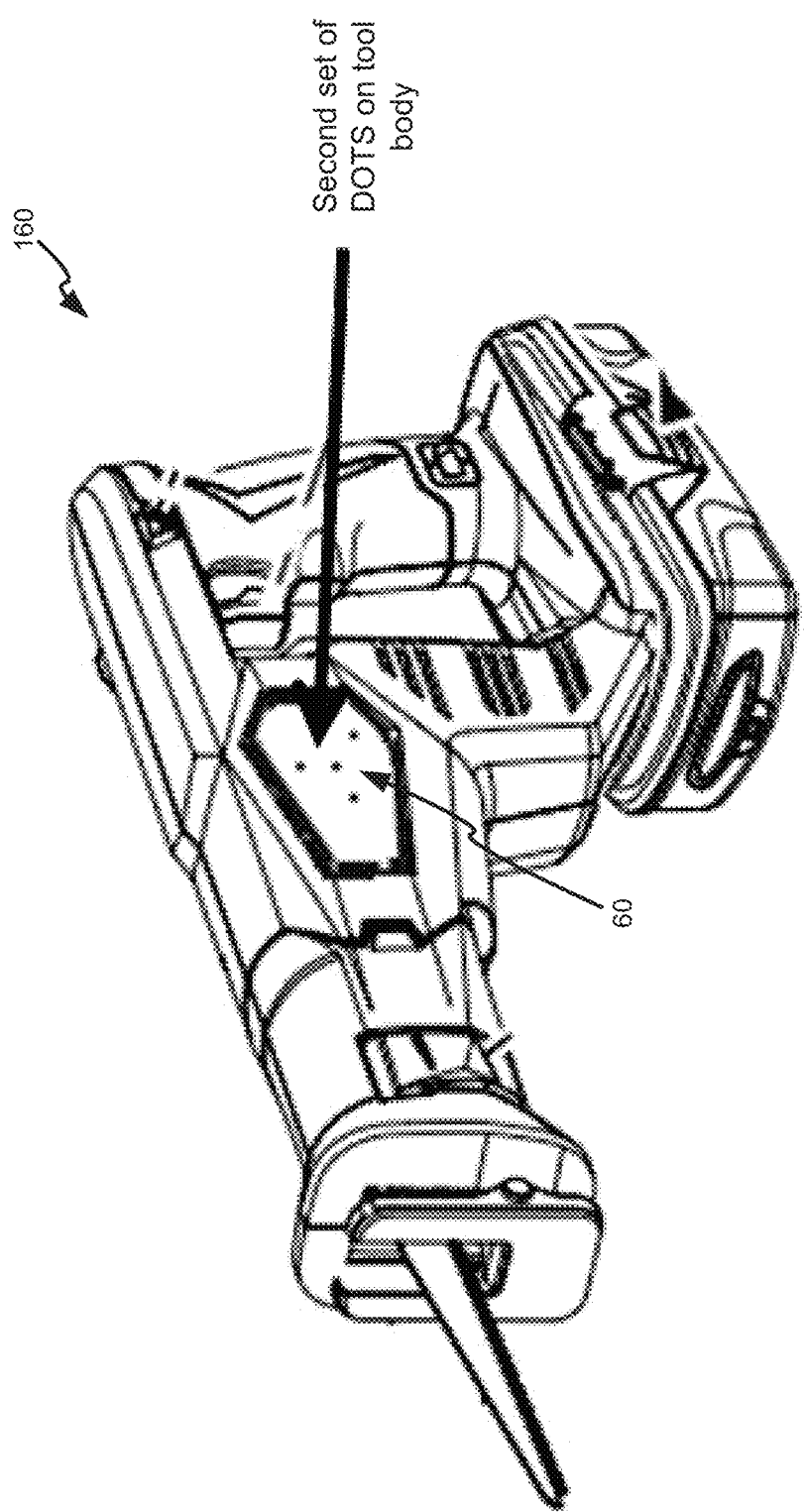
FIG. 6 is a perspective view of an exemplary power tool having multiple terminal constellations, in accordance with a representative embodiment of the present disclosure.

FIG. 6 is a perspective view of an exemplary power tool 140 having multiple terminal constellations 60, in accordance with a representative embodiment of the present disclosure. As illustrated in FIG. 6, one or more terminal constellations 60 may be placed on a device itself, such as the power tool 140 or any suitable device. An advantage of providing one or more terminal constellations on a battery pack is that the battery pack does not have to be removed from the tool 140 when charging. However, depending on the geometry of the tool 140, it may be difficult or inconvenient to place the battery pack 140 down on the charging pad surface 50 when still connected to the tool 140, such as the reciprocating saw shown in FIG. 6, for example. In this case, various embodiments provide one or more sets of contact points 66 on a face of the tool body which may be more convenient. As described above with reference to FIGS. 1 and 2, the additional set(s) of dots may be wired directly to the primary set in the rechargeable device or wired through a switch 64 that selects the appropriate constellation set depending on the situation, and the connection strategy could be controlled by the MCU 65 using alternative logic.

In various embodiments, multiple terminal constellations may be implemented on higher voltage batteries in a number of ways, which all provide the advantage of having lower voltage or amperage at each contact point of each of the multiple terminal constellations. In an exemplary embodiment, the battery cells within the battery pack may be divided into charging groups. For example, a battery pack containing four cells (e.g., ~4v each, connected in series to create ~16V) could have two charging groups of two cells each (e.g., ~8v total per two cells). Each charging group may have a dedicated dot set which would connect to the charging pad. There may be a switch inside the battery pack to decouple the charging groups from each other while the battery is charging and the connection strategy could be controlled by a microprocessor using alternative logic because the cells are typically internally wired in series. In this way, the series sum voltage is divided by two to 4v divisions since there are two charging groups and a more efficient and safe charging system is created compared to a system with a single dot set. In certain embodiments, a system having one dot set may switch between multiple charging groups. For example, with the two charging group example above, there could be two dot sets connected to the two battery sets. The dot sets would switch between two charging sets during the charging process.

Figure 7:
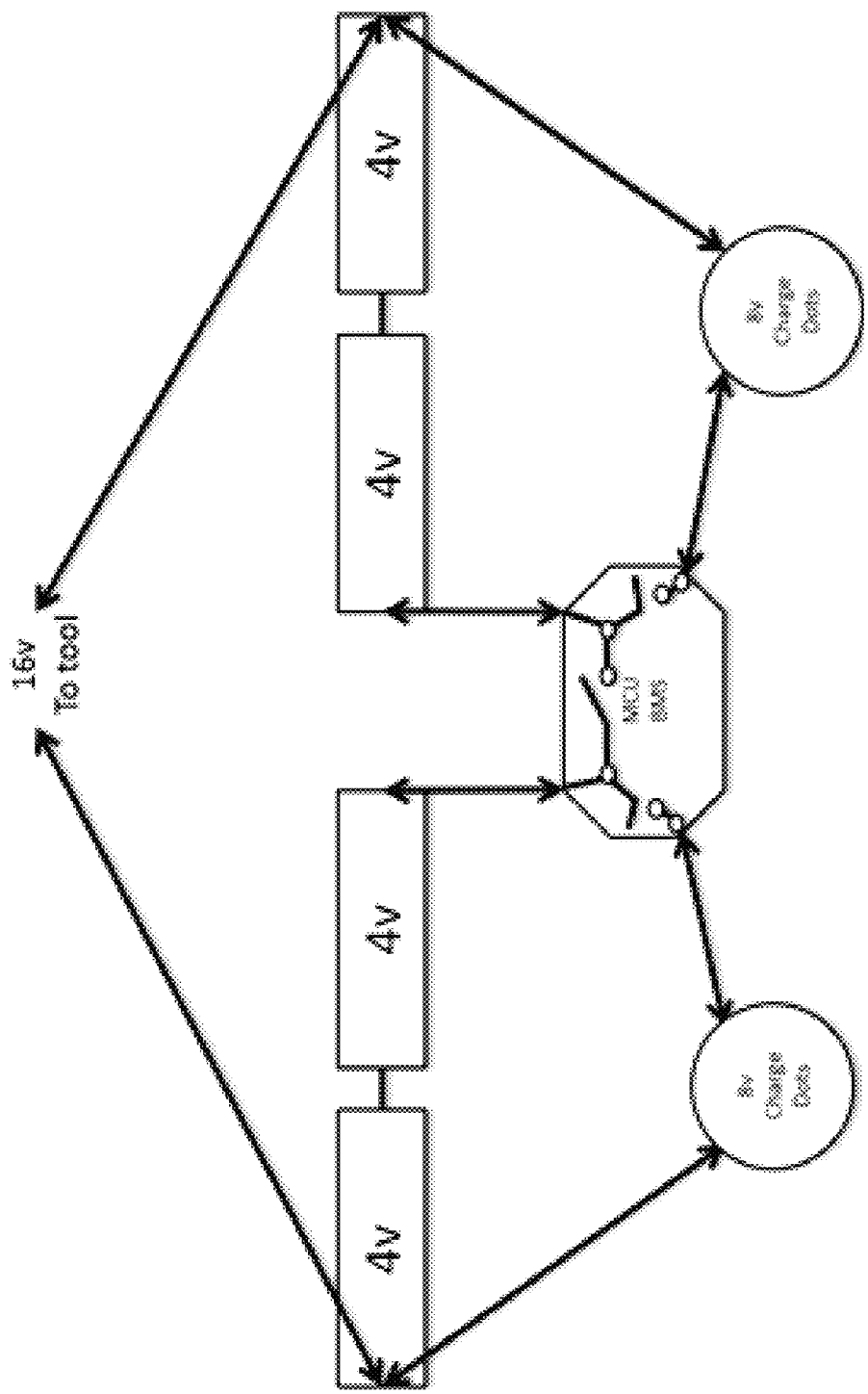
FIG. 7 is a block diagram of an exemplary battery charging system having two terminal constellations to split a charge voltage, in accordance with a representative embodiment of the present disclosure.

FIG. 7 is a block diagram of an exemplary battery charging system having two terminal constellations to split a charge voltage, in accordance with a representative embodiment of the present disclosure. Referring to FIG. 7, two sets of dots may be used to split the charge voltage. The MCU as well as a battery management system (BMS) in the battery pack may be switched based on charge versus discharge mode.

Figure 8:
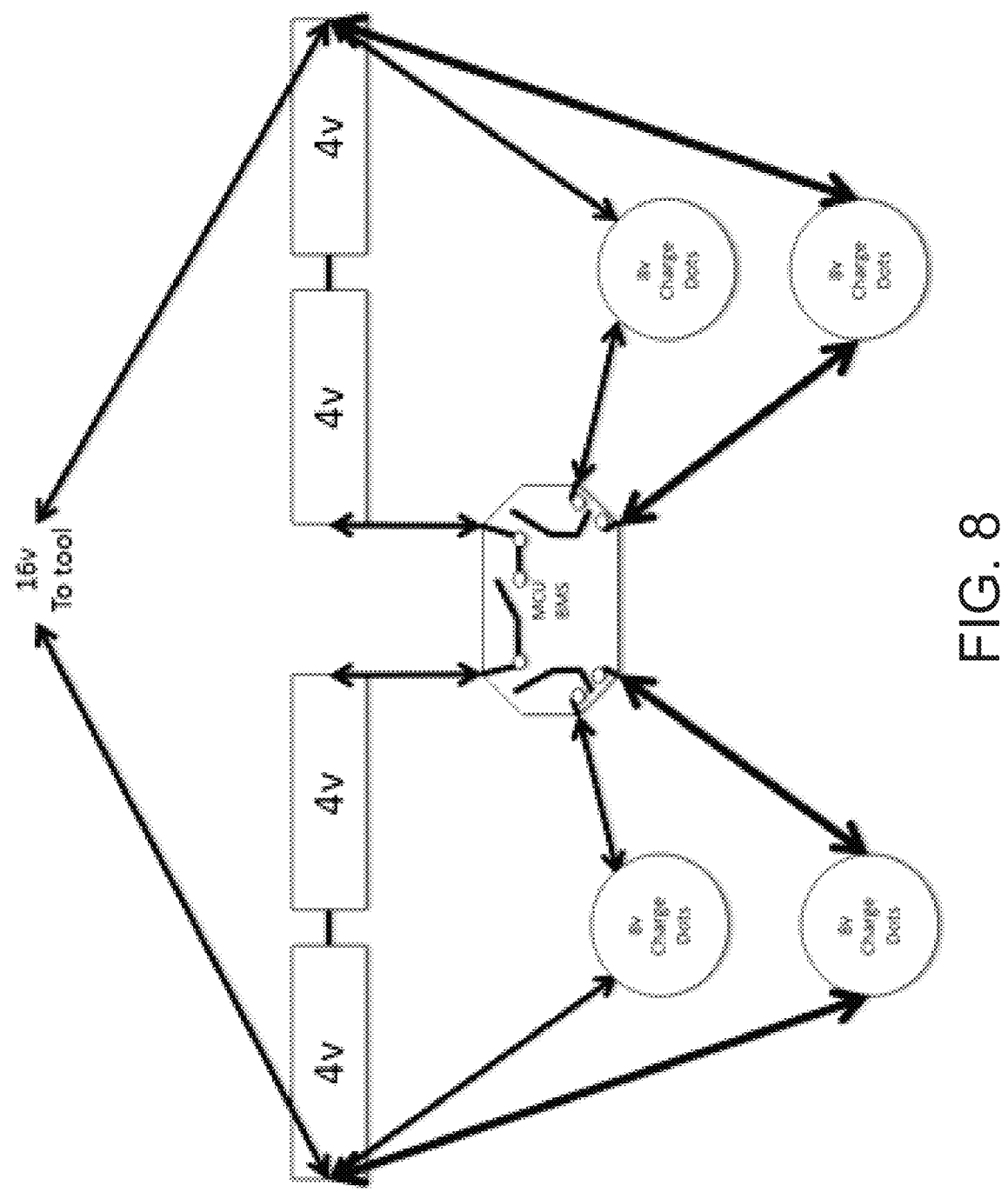
FIG. 8 is a block diagram of an exemplary battery charging system having two terminal constellations to split a charge voltage and two redundant terminal constellations, in accordance with a representative embodiment of the present disclosure.

FIG. 8 is a block diagram of an exemplary battery charging system having two terminal constellations to split a charge voltage and two redundant terminal constellations, in accordance with a representative embodiment of the present disclosure. Referring to FIG. 8, a first two sets of dots may be used to split the charge voltage and each of the first two sets of dots may have a separate redundant set of dots for reliability.

Figure 9:
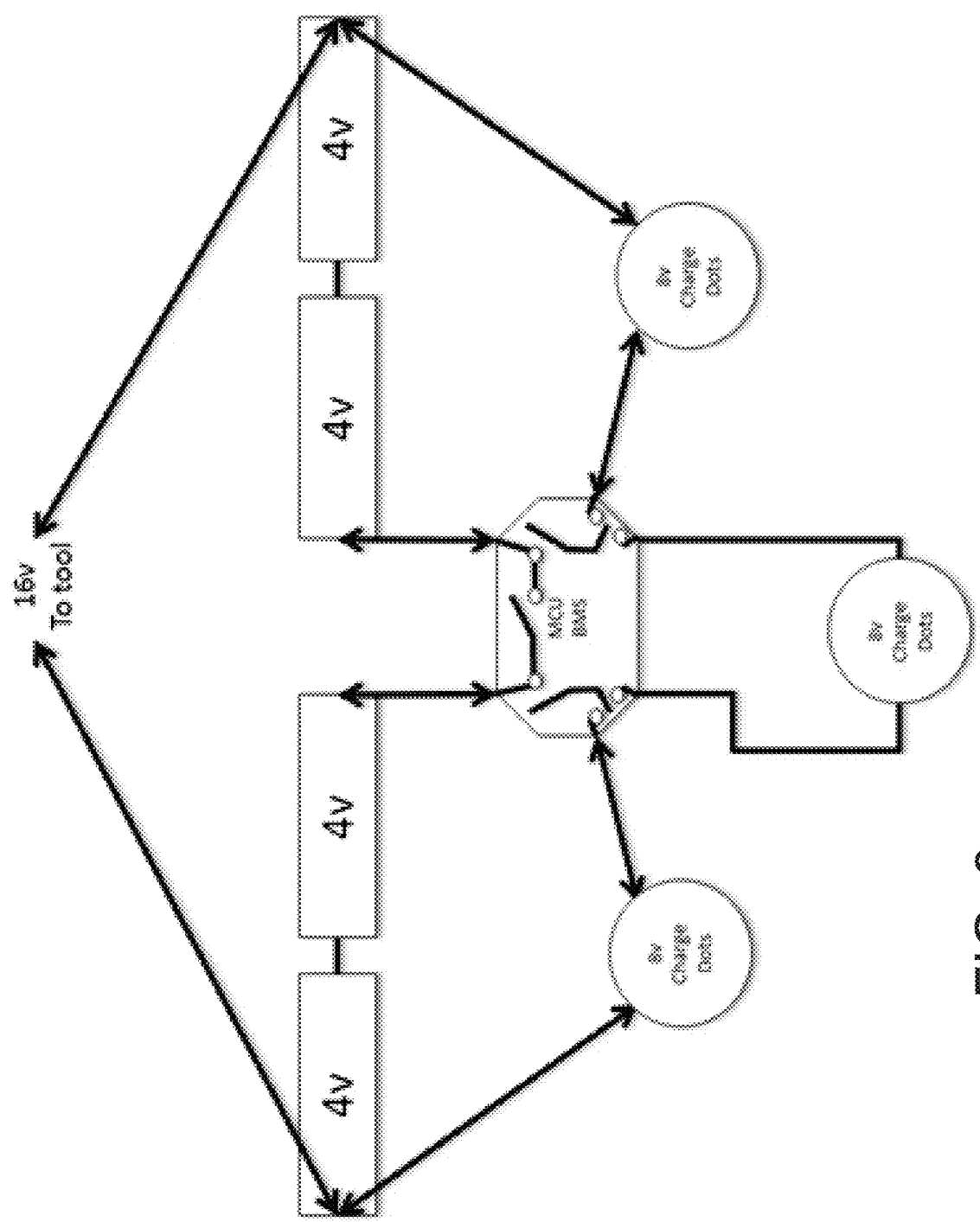
FIG. 9 is a block diagram of an exemplary battery charging system having two terminal constellations to split a charge voltage and one redundant terminal constellation, in accordance with a representative embodiment of the present disclosure.
Figure 10:
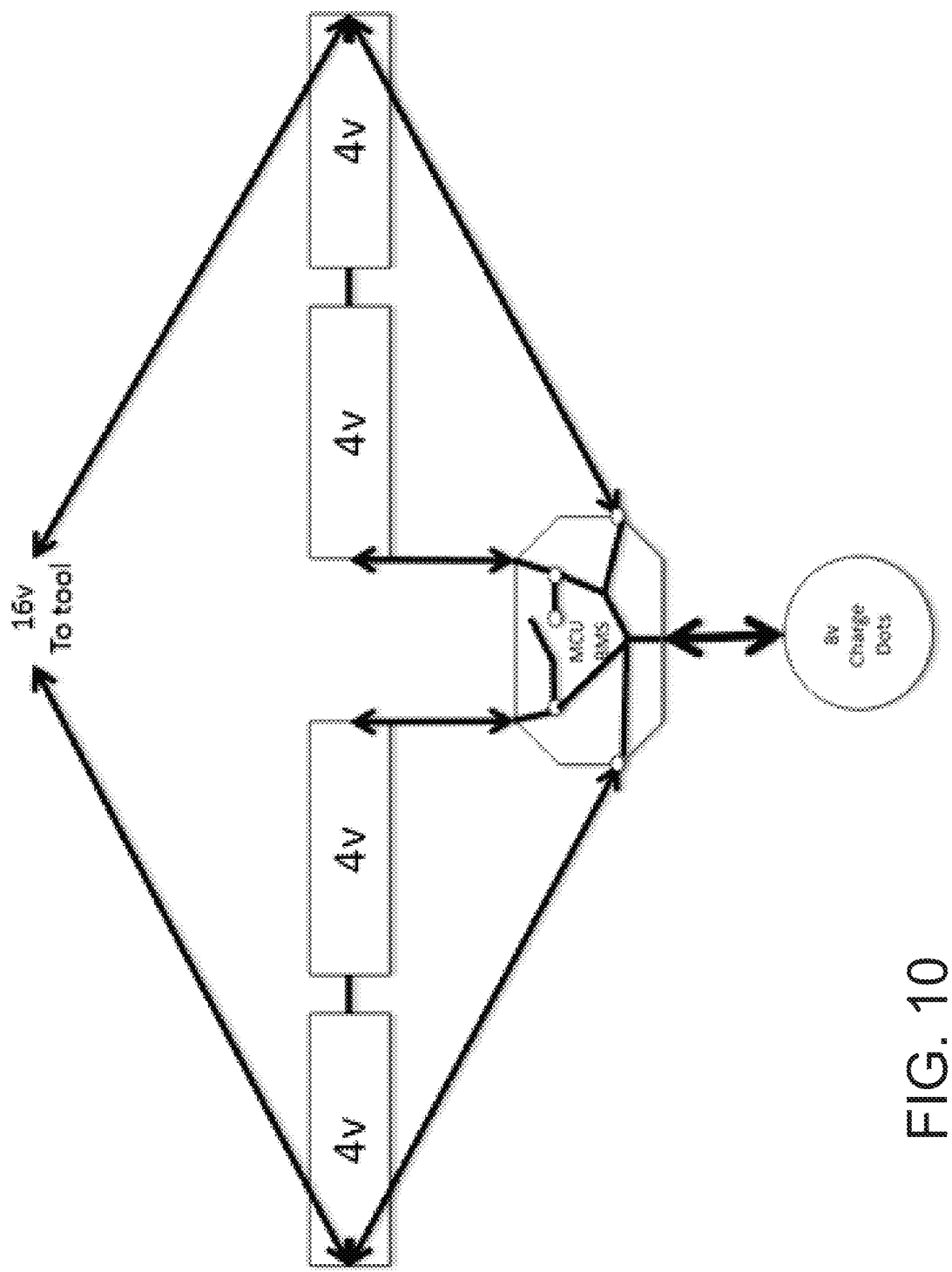
FIG. 10 is a block diagram of an exemplary battery charging system charging a battery pack having cells connected in series, in accordance with a representative embodiment of the present disclosure.

FIG. 9 is a block diagram of an exemplary battery charging system having two terminal constellations to split a charge voltage and one redundant terminal constellation, in accordance with a representative embodiment of the present disclosure. As illustrated in FIG. 9, a first two sets of dots may be used to split the charge voltage and an additional set of redundant dots may effectively float where needed based on switching logic after the bridge rectifier.

In various embodiments, the multiple terminal constellations may be wired together inside the device 22. Additionally and/or alternatively, a switch may be implemented to select from which of the terminal constellations to charge. The microcontroller unit may include a memory that is in communication with a processor that is used to determine the connection strategy and control the switch. The charge signals received via the switch from the one or more of the multiple terminal constellations are provided to a rectifier, such as a four-way bridge rectifier. Because it is not possible to know which contact(s) of each of the constellations will land on a positive strip and which contact(s) of each of the constellations will land on a negative strip, a four-way bridge rectifier is used to right the random polarity. The positive and negative power signal output by the rectifier is provided to a regulator that provides a regulated output to the battery.

Figure 11:
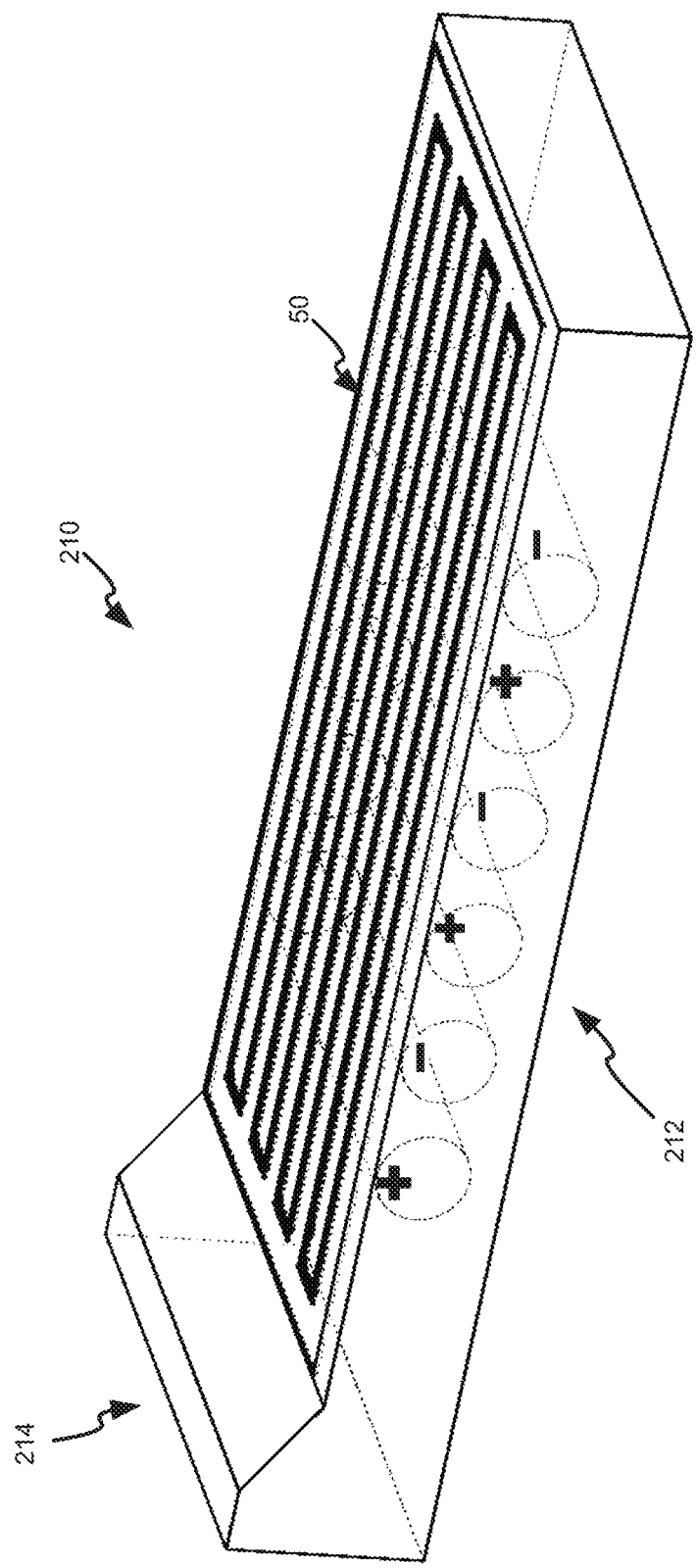
FIG. 11 provides a perspective view of an exemplary battery charging pad with integrated battery cells.
Figure 12:
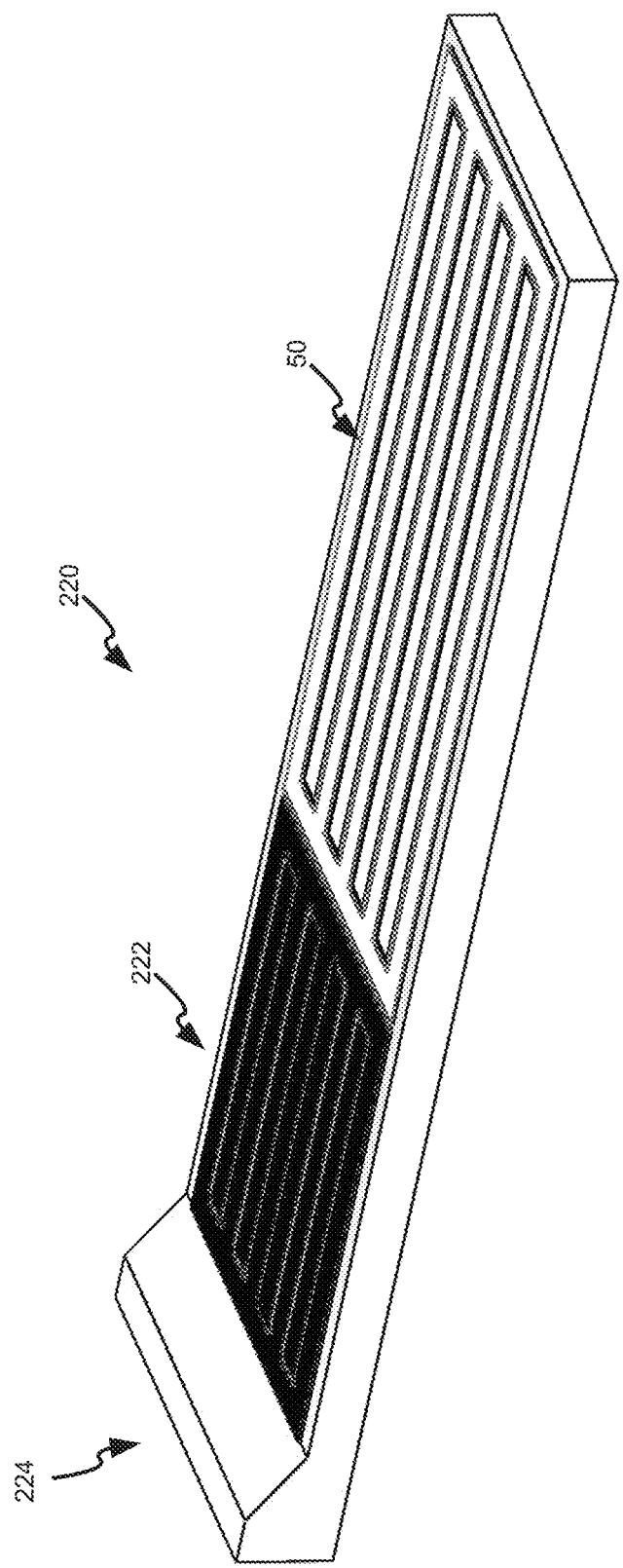
FIG. 12 provides a perspective view of an exemplary battery charging pad with integrated solar panels.

Other aspects of the present disclosure are related to improved portability of the charging system. The charging system 10 described above in regard to FIGS. 1 and 2 includes an AC power supply 30 that received power from an AC wall outlet via a power cord 32. Due to the plug-in requirement of the power cord, the charging system 10 may have limited portability. FIGS. 11 and 12 respectively depict charging system 210 and 220 that include alternate and/or additional power supplies.

In particular, FIG. 11 depicts a charging system 210 that may be implemented in a manner similar to charging system 10. However, in additional and/or alternatively to the power supply 30 and power cord 32 of FIGS. 1 and 2, the charging system 210 includes one or more battery cells 212. The battery cells of the charging system 210 may be internal to its charging pad 214. Furthermore, the battery cells 212 may have sufficient capacity to charge power tool batteries or other devices 22 placed on the charging pad surface 50 while the charging pad 214 is not connected to AC power (e.g., plugged into an AC wall outlet). As such, the charging system 210 may exhibit increased portability since the charging system 210 may operate without regard to the availability and/or proximity to an AC power source such as, for example, an AC wall outlet. Specifically, the integrated battery cells 212 of the charging pad 214 may be charged while connected to AC wall outlet. After charging, the charging pad 214 may be disconnected from AC wall outlet. While disconnected from the AC wall outlet, the charging pad 214 may utilize its integrated battery cells 214 to charge devices 22 placed on the charging pad 214. Thus, the charging system 210 may enable charging on job sites and in places where AC wall power is not readily available and/or readily accessible.

Referring now to FIG. 12, another charging system 220 is shown. The charging system 220 may be implemented in a manner similar to charging system 10. However, in additional and/or alternatively to the power supply 30 and power cord 32 of FIGS. 1 and 2, the charging system 220 includes one or more solar panels 222. Power generated by the solar panels 222 may charge integrated battery cells similar to those of FIG. 11, which in turn, may charge battery cells 70 and/or other devices 22 placed on the charging pad surface 50 of the charging pad 224. Power generated by the solar panels 222 may also pass through the charging pad surface 50 to directly charge battery cells 70 and/or other devices 22 placed on the charging pad 224.

Figure 13:
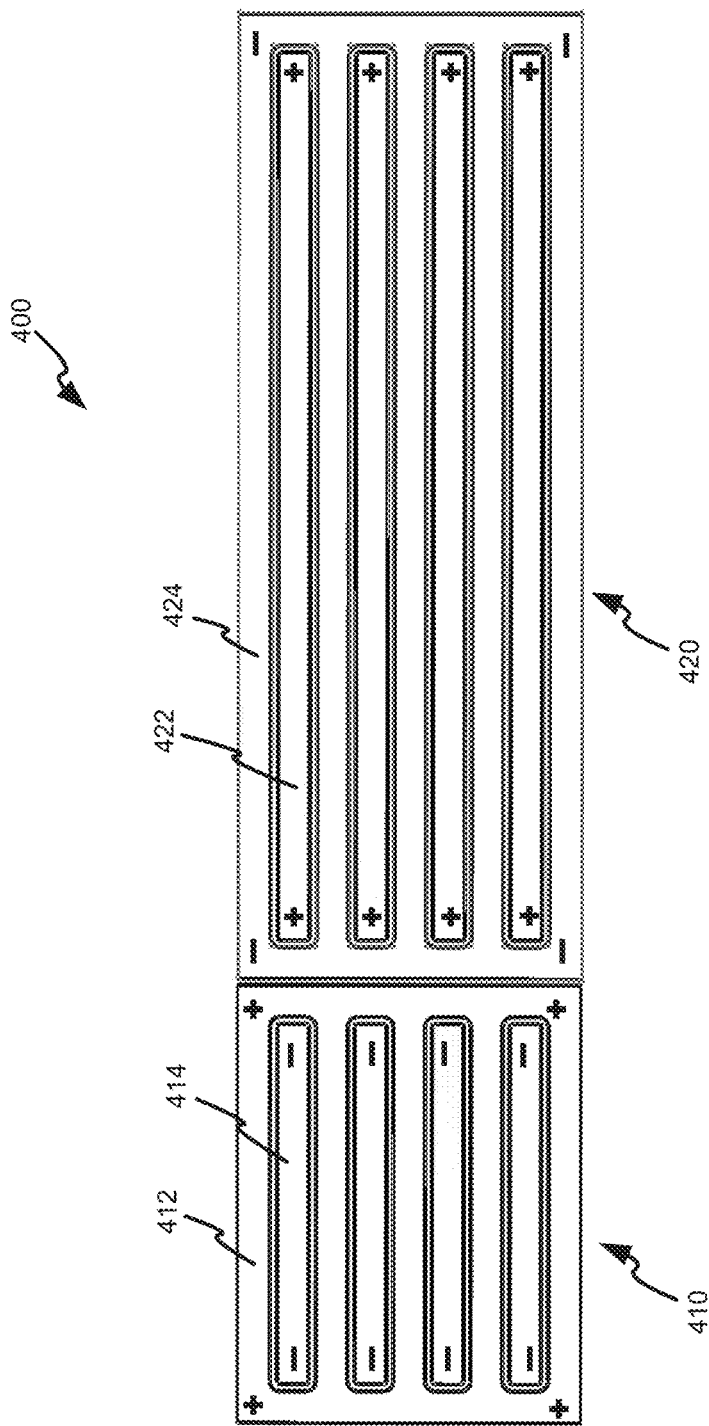
FIG. 13 depicts a charging pad surface with multiple regions.

Referring now to FIG. 13, an embodiment of a charging pad surface 400 is shown which may be used to implement the charging pad surface 50 of the charging systems 10, 210, and 220 of FIGS. 1, 11, and 12. The charging pad surface 400 includes at least two separate, charging regions or zones 410, 420. The multiple charging regions 410, 420 of the charging pad surface 400 may permit prioritization of devices 22 to be charged.

As shown in FIG. 1, the charging pad surface 50 of the charging pad 20 has a single charging zone. The charging pad surface 50 may simultaneously charge multiple rechargeable devices 22, such as multiple battery packs, that are placed upon the charging pad surface 50. To this end, the charging pad 20 and its surface 50 may equally split its total pad power across each of the device 22, thus resulting in the charging pad 20 charging each device 22 at an equal rate. The charging pad surface 400 may have at least two separate, charging regions 410, 420. As shown, region 410 includes a positive electrode 412 and a negative electrode 414 similar to electrodes 52, 54 of FIG. 1. Similarly, region 420 includes a positive electrode 422 and a negative electrode 424 similar to electrodes 52, 54 of FIG. 1. As such, each region 410, 420 has its own separate, electrodes which may permit the charging pad surface 400 to charge devices 22 at different rates based on the region 410, 420 upon which the device 22 is placed.

Figure 14:
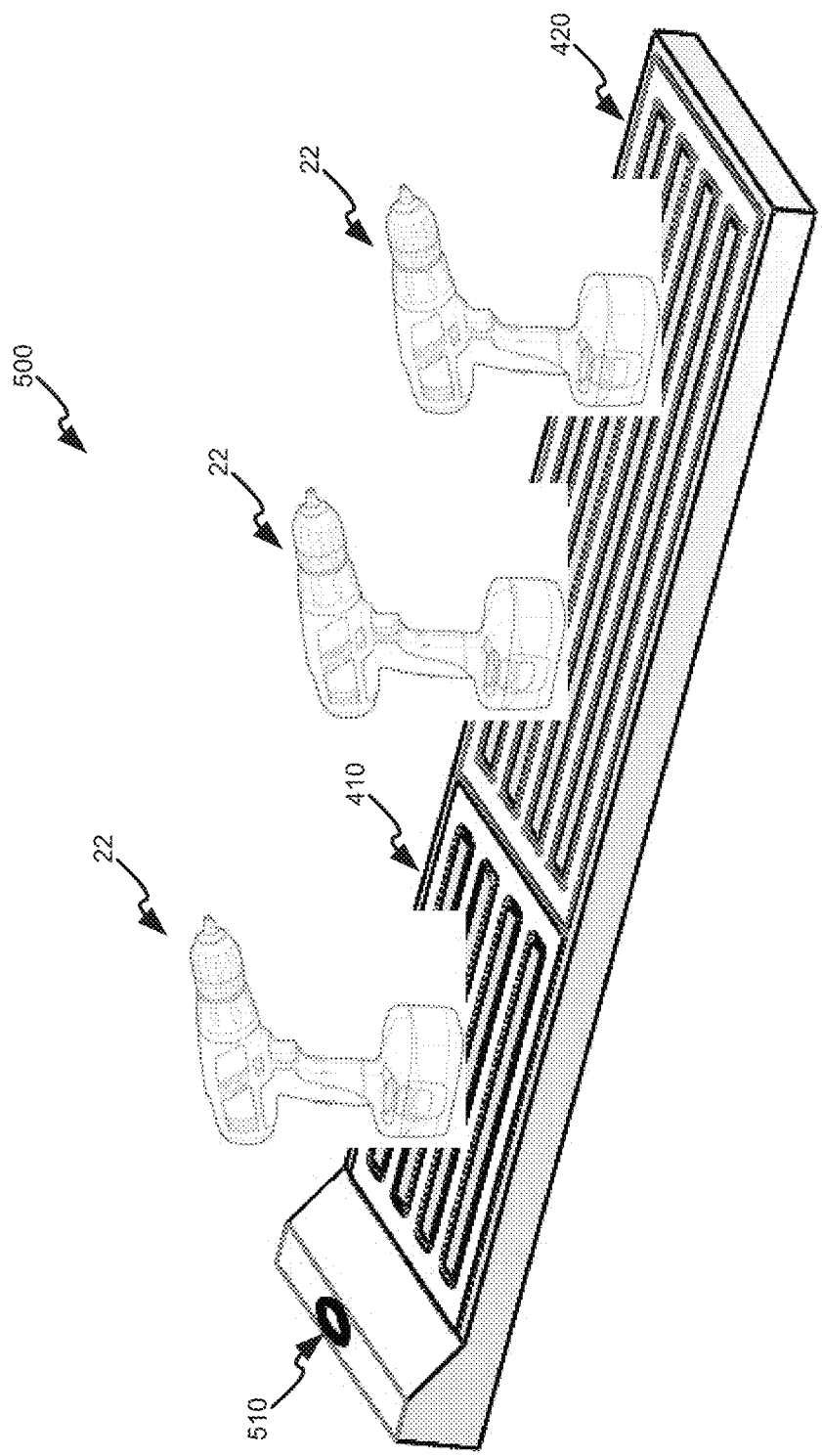
FIG. 14 depicts rechargeable devices placed on charging pad surface with multiple regions.
Figure 15:
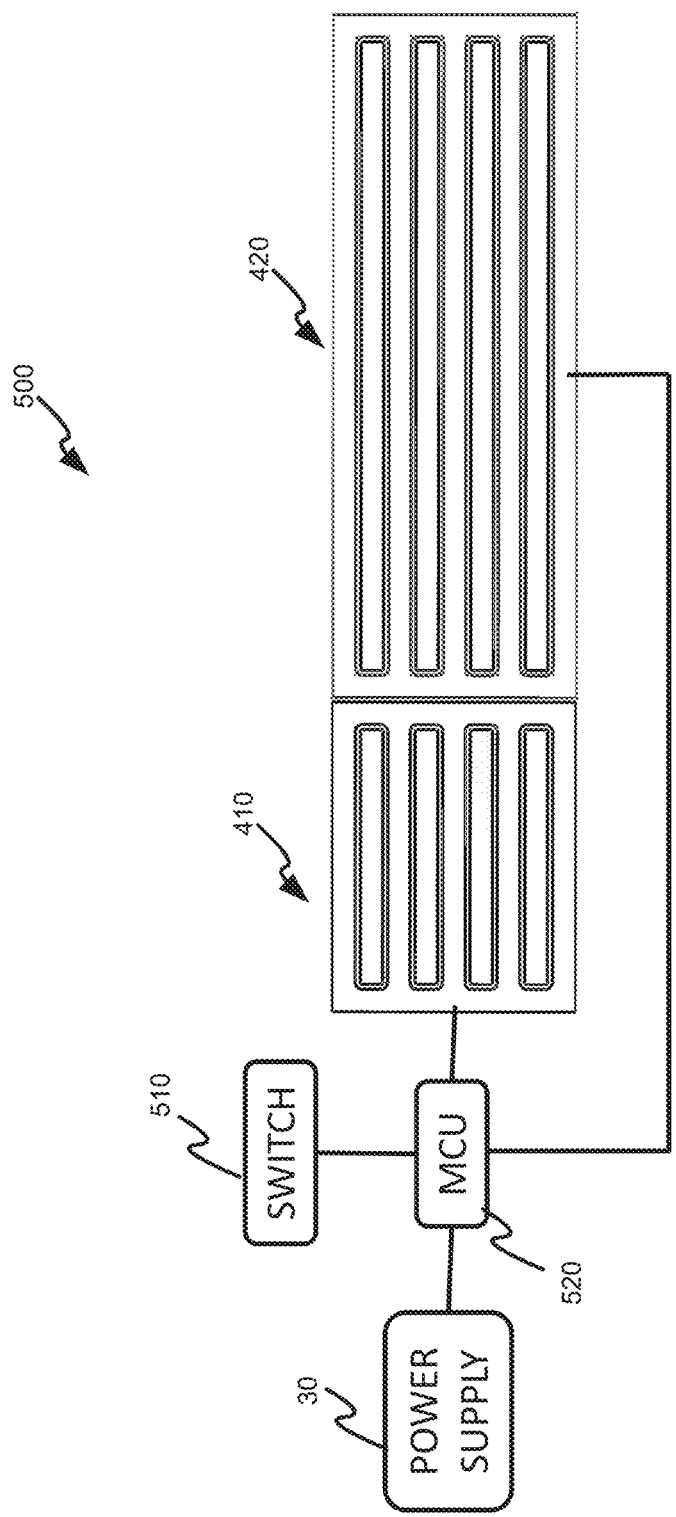
FIG. 15 depicts an exemplary charging system that prioritizes regions of the charging pad surface based on a user control.

Referring now to FIGS. 14 and 15, one embodiment of a charging system 500 that provides prioritized charging is shown. As shown, the charging system 500 may include a manually operated control 510, such as a button, switch, dial, etc., which the user may actuate in order to select a boost mode of operation. A microcontroller unit (MCU) 520 of the charging system 500 may receive a signal indicative of whether the user has activated the control 510. Based upon such a signal, the MCU 520 may selectively operate the charging pad surface 400 per a normal mode or the boost mode of operation. During the normal mode of operation, the MCU 520 may cause power (current and/or voltage) to be evenly distributed among the charging regions 410, 420. During the boost mode of operation, the MCU 520 may be configured to cause more power (current and/or voltage) to be delivered to charging region 410 than when in the normal mode of operation. Such an increase in power to the region 410 may also reduce the power delivered to the region 420. As a result, during the boost mode, devices 22 placed on region 410 may receive more power than devices 22 on region 410 and may be effectively given a higher charging priority than devices 22 placed on region 420. Thus, such prioritized devices 22 on region 410 may charge more quickly than devices on region 420.

Figure 16:
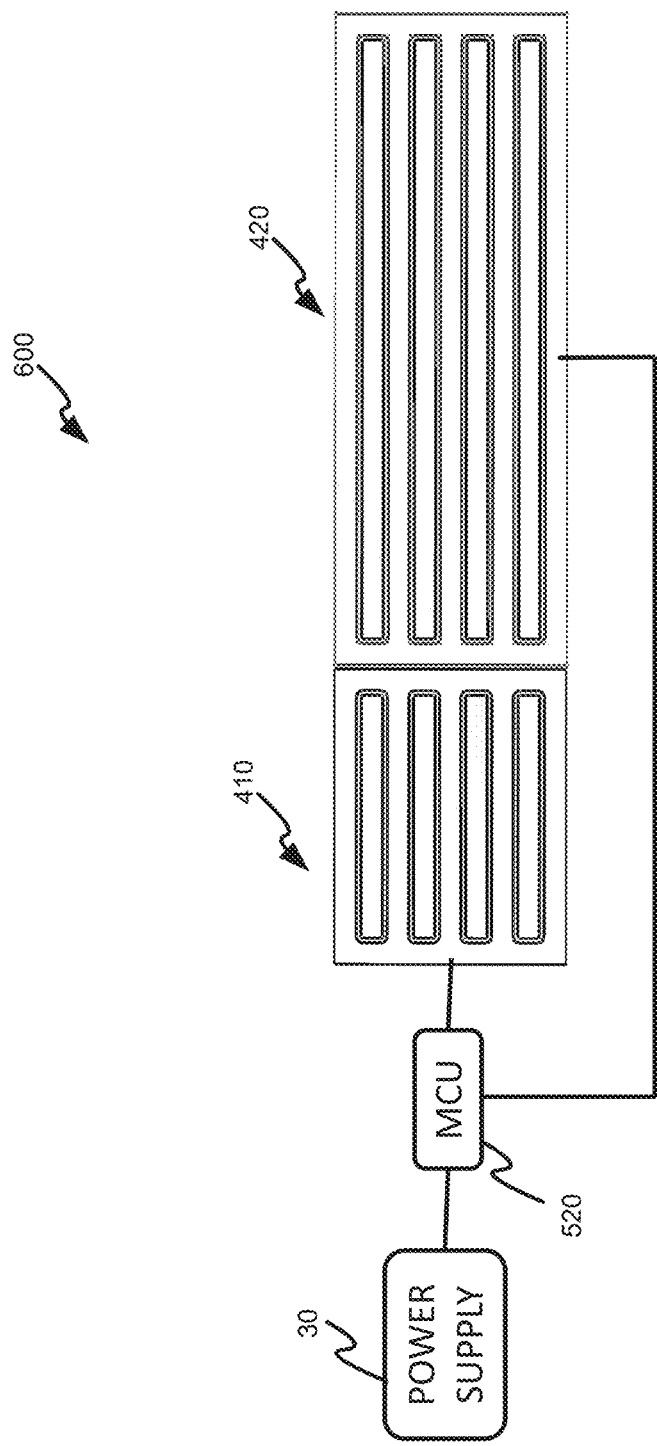
FIG. 16 depicts an exemplary charging system with a permanently prioritized region of the charging pad surface.

As shown, the charging system 500 of FIGS. 14 and 15 includes a control 510 which a user may actuate in order to select between a normal mode and a boost mode of operation. The charging system 600 of FIG. 16 does not include such a control 510. Instead, the MCU 520 of the charging system 600 of FIG. 16 may be configured to permanently boost the region 410 by some predetermined permanent amount. Thus, the charging system 600 may have a single mode of operation in which the charging system 600 prioritizes charging of devices 22 placed on region 410 in a manner similar to the boost mode of operation provided by the charging system 500.

Figure 17:
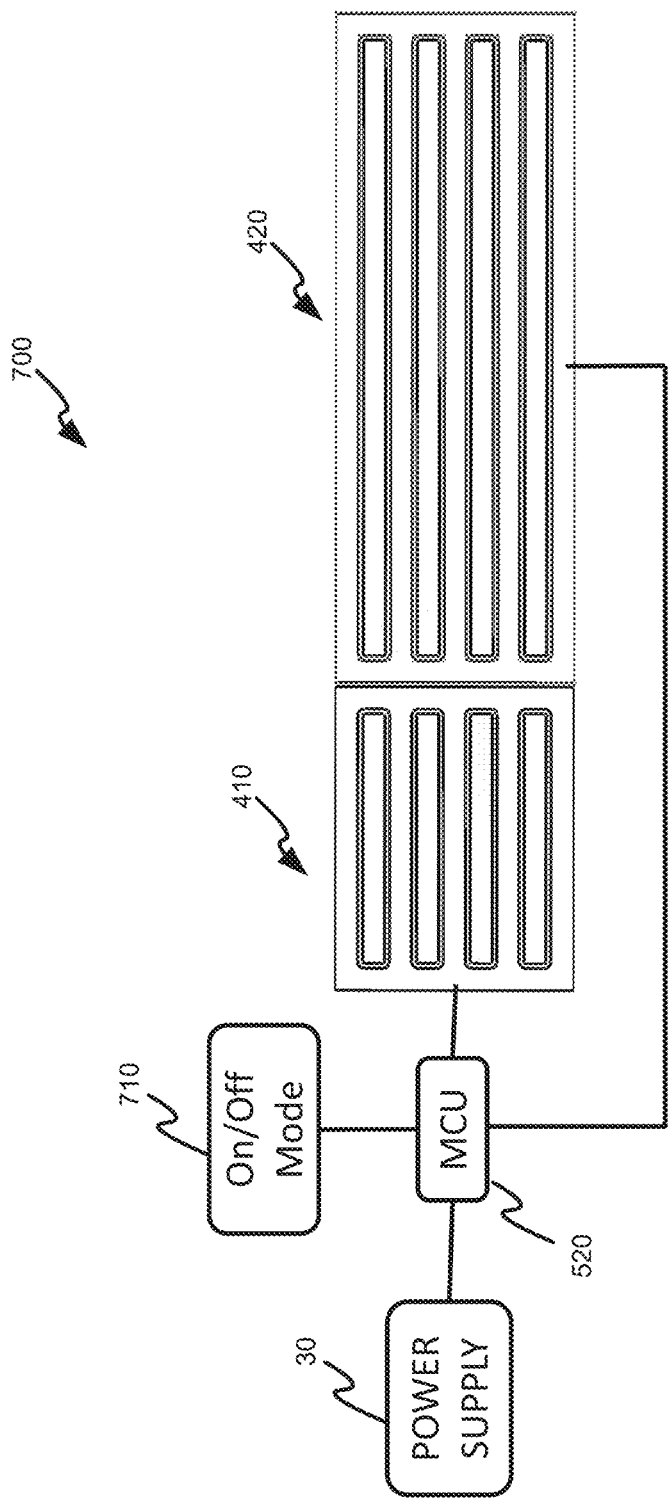
FIG. 17 depicts an exemplary charging system that prioritizes regions of the charging pad surface based on discharge levels of devices on the regions of the charging pad surface.
Figure 18:
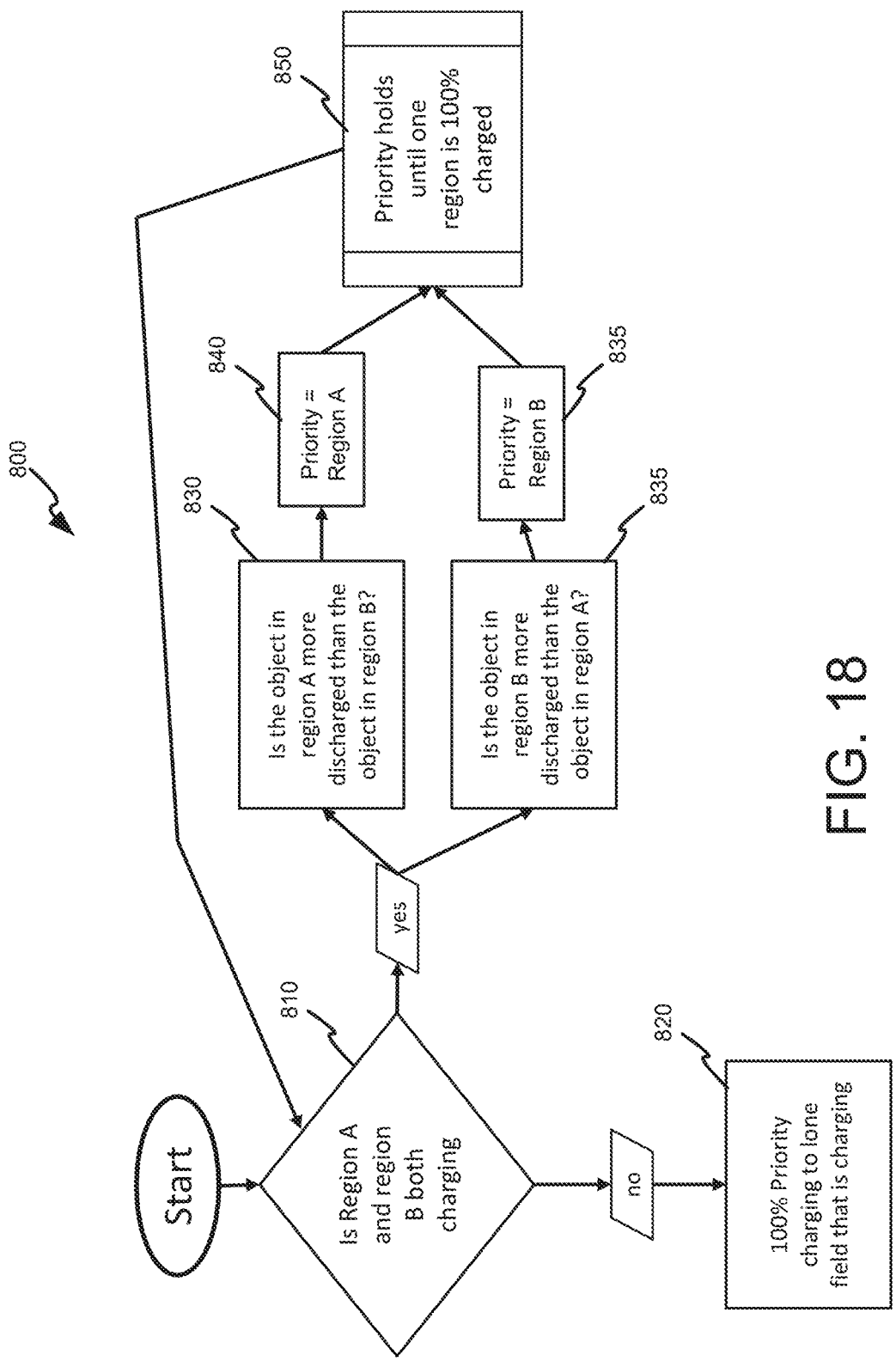
FIG. 18 depicts a flowchart for a method of prioritizing regions of the charging pad surface based on discharge levels of devices on the regions of the charging pad surface.

Referring now to FIGS. 17 and 18, another charging system 700 is depicted, which may provide a reactive boost mode. The charging system 700 may be implemented similarly to the charging system 500 of FIGS. 14 and 15. For example, the charging system 700 may include a manually operated control 710, such as a button, switch, dial, etc., which the user may actuate in order to select the reactive boost mode of operation. Per the reactive mode of operation, the MCU 520 may monitor voltage levels of the rechargeable devices 22 placed on regions 410, 420. Based on such monitored voltage levels, the MCU 520 may select a region 410, 420 to prioritize. For example, the lower the charge of a rechargeable device 22 on a region 410, 420, the higher the charging priority the MCU 520 may assign the respective region 410, 420 to increase an effective charge rate of the rechargeable device 22 on such region 410, 420.

One embodiment of a method 800 for reactively prioritizing regions 410, 420 based monitored voltage levels or charge levels of the rechargeable devices 22 is shown in FIG. 18. As shown, the MCU 520 of the charging system 700 may determine at 810 whether regions 410, 420 are both charging devices 22. If both regions are not charging, then the MCU 520 at 820 may assign 100% priority to the region 410, 420 that is charging a device 22 and direct 100% of the charging power provided by power supply 30 to the selected region 410, 420.

At 830 and 835, the MCU 520 may determine which region 410, 420 has the device 22 that is the most discharged and therefore in the greatest need of a charge. The MCU 520 at 840, 845 assign priority to the region 410, 420 which has the device 22 that is the most discharged. The MCU 520 at 850 may retain the assigned priorities until the devices 22 of the priorities region are fully charged. After fully charging the devices 22, the MCU 520 may return to 810 and update assigned priorities based on monitored discharge or voltage levels of the devices 22 place on regions 410, 420.

As shown in FIG. 14, multiple devices 22 may be placed on the charging pad surface 400. Similarly, multiple devices 22 may be placed on the charging pad surface 50 of FIGS. 1 and 2. Thus, the charging pad surfaces 50, 400 may be in the process of charging several devices 22. Moreover, as explained above, the constellations 60, 62 may permit the devices 22 to be operatively placed on the charging pad surfaces 50, 400 in a vast number of orientations. As such in FIGS. 19-21, such devices 22 may include a status indicator 910 that provides a visual indication as to the charging status of the respective device 22. As shown, the status indicator 910 in one embodiment comprises a plurality visual indicators 912. The visual indicators may be positioned on multiple sides of the device 22 to ensure that the visual indicators 912 may be readily viewed by a user when the charging pad surface 50, 400 becomes cluttered with multiple devices 22 or when the orientation of the device 22 results in one or more of the visual indicators 912 facing away from the user or being obscured by the charging pad surface 40, 500 or other devices 22.

Figure 20:
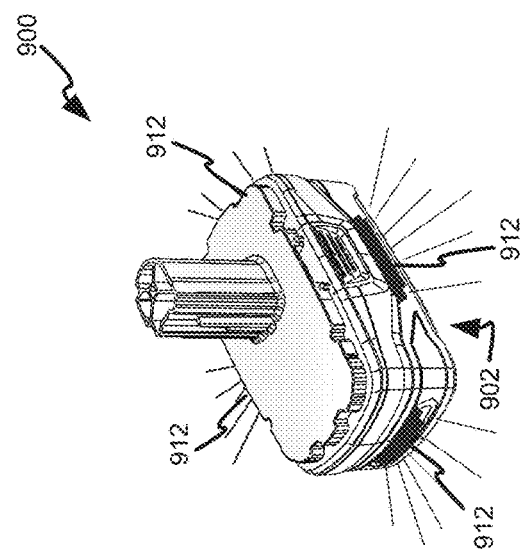
FIGS. 19-21 depict a status indicator for rechargeable devices.
Figure 21:
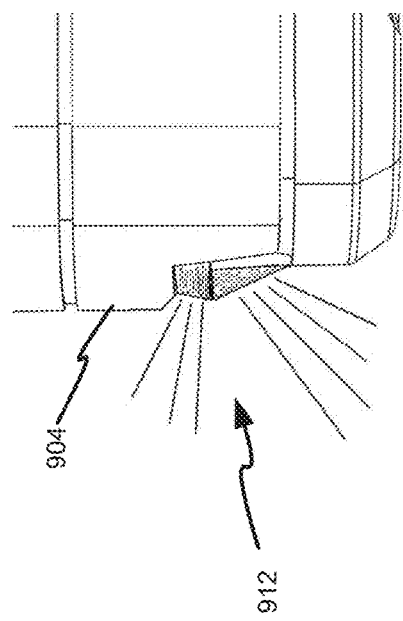
Figure 19:
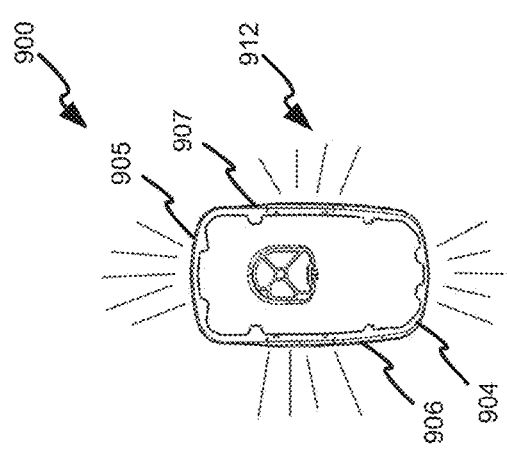

In particular, FIGS. 19-21 depict a battery pack 900 having one or more constellations on a bottom surface 902 of the battery pack 900. See, e.g., FIG. 4. The visual indicators 912 may be positioned on a front face 904, a back face 905, a left face 906, and right face 907 to provide a ring of light around the entire battery pack 900. The visual indicators 912 may include a plurality of illumination devices such as light emitting diodes (LEDS), incandescent lamps, halogen lamps, fluorescent lamps strategically placed on each of the faces 904, 905, 906, 907 of the battery pack 900. The visual indicators 912 may also be implemented via a single illumination source that utilizes light pipes, optical fiber, light rings, solid transparent rods, etc., to extend visual broadcast of the single illumination source from each of the faces 904, 905, 906, 907.

Thus, when the battery pack 900 is in a charging mode, the status indicator 910 via the visual indicators 912 may emit light 360 degrees around the battery pack 900 or emit light from a plurality of positions from the faces 904, 905, 906, 907 of a battery pack 900. In addition to the concept of providing 360 degrees of visual feedback, the visual indicators 912 may be further configured to direct their emitted light toward the charging pad surface 50, 400 as shown in FIG. 21. In some embodiments, the charging pad surface 50, 400 provides a reflective surface. As such, light emitted by the status indicator 910 may be reflected off the charging pad surface 50, 400 in order to provide additional viewing angles for assessing the status of the battery pack 900 thus permitting the user to simply look down at the battery pack 900 during a charge mode. To this end, the visual indicators 912 may include a lens, light guide, etc., designed to direct emitted light towards the charging pad surface 40, 500 when the constellations 60, 62 are in contact with the electrodes 52, 54 of the charging pad surface 40, 500.

The status indicator 910 may provide status information such as whether the device 22 is charging, a current charge capacity, whether charging is complete, an error condition, etc. To this end, the status indicator 910 may convey such information via the presence or absence of emitted light, the color of the emitted light, a blinking pattern of emitted light, pattern of illuminated faces 904, 905, 906, 907, and/or some other manner of illuminating and/or not illuminating the visual indicators 912.

Although certain embodiments may describe providing conductive charging with multiple terminal constellations in the context of a power tool, for example, unless so claimed, the scope of various aspects of the present disclosure should not be limited to power tools and may additionally and/or alternatively be applicable to any suitable device. For example, certain embodiments provide high voltage and/or high capacity use of constellation/dot style conductive charging for laptop computers, electric cars, or any suitable device.

Various embodiments provide charging a single battery and/or device such as a power tool using multiple terminal constellations (also referred to as multiple dot sets). In certain embodiments, a plurality of dot sets may create redundancy from a contact standpoint. If one dot set (e.g., 4 contact points or a plurality of contact points) is not making full contact and providing input to the four-way bridge rectifier or a plurality of bridge rectifiers, the microcontroller unit may switch to a redundant set of dots.

Aspects of the present disclosure provide a method of minimizing voltage at the contact points by splitting the voltage substantially in half in the case of a 16V battery pack splitting the voltage in half with two sets of dots, for example. This method may be used with higher voltage packs (e.g., 60V packs etc.).

In certain embodiments, the voltage is minimized at the contact points by splitting the voltage and one or more additional redundant set of dots for each pair of dots that have already split the voltage may be implemented.

In an exemplary embodiment, one additional set of redundant dots may be determined with a logic switch as to which split voltage dot set is in need of redundancy.

In various embodiments, a 16V or any suitable voltage battery pack may be charged at a rate of half (e.g., 8V) or even lower. Although this solution would prove less complex, the charge time would essentially double because of limiting the charge rate. Although the charge rate is being reduced, the discharge rate of the battery pack is not affected.

Various aspects of the present disclosure have been described in reference to exemplary conductive charging systems such as the charging systems described above in regard to FIGS. 1-21. However, aspects of the present disclosure are suitable for use with inductive charging systems, capacitive charging systems, and/or other types of charging systems.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A charging pad, comprising:
    a power supply that supplies charging power;
    a charging pad surface that is divided into a plurality of non-overlapping surface regions;
    a microcontroller that is configured to deliver a first portion of the charging power to a first surface region of the plurality of non-overlapping surface regions and a second portion of the charging power to a second surface region of the plurality of non-overlapping surface regions, the first portion being greater than the second portion; and
    a manually operated control that permits a user to select between a boost mode of operation and a normal mode of operation;
    wherein the microcontroller is configured to deliver substantially equal portions of the charging power to the first surface region and the second surface region in response to the normal mode of operation being selected via the manually operated control.

2. The charging pad of claim 1, wherein the microcontroller is configured to deliver the first portion of the charging power to the first surface region in response to the boost mode of operation being selected via the manually operated control.

3. The charging pad of claim 1, wherein the first portion of the charging power is a predetermined, permanent amount of the charging power.

4. The charging pad of claim 1, wherein:
    the first surface region comprises a first plurality of metal strips that span the first surface region; and
    the first plurality of metal strips are configured to directly contact a first plurality of contact points of a first rechargeable device when placed on the first surface region and conductively charge the first rechargeable device via the first plurality of contact points in contact with the first plurality of metal strips.

5. The charging pad of claim 4, wherein:
    the second surface region comprises a second plurality of metal strips that span the second surface region; and
    the second plurality of metal strips are configured to directly contact a second plurality of contact points of a second rechargeable device when placed on the second surface region and conductively charge the second rechargeable device via the second plurality of contact points in contact with the second plurality of metal strips.

6. The charging pad of claim 1, wherein the first surface region simultaneously charges a first rechargeable device and a second rechargeable device when placed on the first surface region.

7. A charging pad, comprising:
    a power supply that supplies charging power;
    a charging pad surface that is divided into a plurality of non-overlapping surface regions; and
    a microcontroller that is configured to:
        monitor a first charge level of a first rechargeable device when placed on a first surface region of the plurality of non-overlapping surface regions;
        monitor a second charge level of a second rechargeable device when placed on a second surface region of the plurality of non-overlapping surface regions; and
        direct a larger portion of the charging power to the first surface region than to the second surface region in response to determining that the first charge level is less than the second charge level, wherein:
    the first surface region comprises a first plurality of metal strips that span the first surface region;
    the first plurality of metal strips are configured to directly contact a first plurality of contact points on the first rechargeable device and conductively charge the first rechargeable device via the first plurality of contact points in contact with the first plurality of metal strips;
    the second surface region comprises a second plurality of metal strips that span the second surface region; and the second plurality of metal strips are configured to directly contact a second plurality of contact points on the second rechargeable device and conductively charge the second rechargeable device via the second plurality of contact points in contact with the second plurality of metal strips.

8. The charging pad of claim 7, wherein the microcontroller is configured to direct the charging power solely to the first surface region when the first rechargeable device is placed on the first surface region and no rechargeable devices are placed on the other surface regions of the plurality of non-overlapping surface regions.

9. The charging pad of claim 7, wherein the microcontroller is configured to direct the charging power solely to the first surface region when the first rechargeable device is placed on the first surface region and rechargeable devices placed on the other surface regions of the plurality of non-overlapping surface regions are fully charged.

10. The charging pad of claim 7, wherein the microcontroller is configured to determine the first charging level and the second charging level based on a first voltage of the first rechargeable device and a second voltage of the second rechargeable device.

11. The charging pad of claim 7, wherein the microcontroller is configured to determine the first charging level and the second charging level based on a first discharged amount of the first rechargeable device and a second discharged amount of the second rechargeable device.

12. The charging pad of claim 7, wherein the first plurality of metal strips are configured to:
   directly contact a third plurality of contact points on a third rechargeable device; and
   conductively charge the third rechargeable device via the third plurality of contact points while conductively charging the first rechargeable device.

13. A charging pad, comprising:
   a power supply that supplies charging power;
   a charging pad surface that is divided into a plurality of non-overlapping surface regions; and
   a microcontroller that is configured to deliver a first portion of the charging power to a first surface region of the plurality of non-overlapping surface regions and a second portion of the charging power to a second surface region of the plurality of non-overlapping surface regions, the first portion being greater than the second portion, wherein:
   the first surface region comprises a first plurality of metal strips that span the first surface region;
   the first plurality of metal strips are configured to directly contact a first plurality of contact points of a first rechargeable device when placed on the first surface region and conductively charge the first rechargeable device via the first plurality of contact points in contact with the first plurality of metal strips;
   the second surface region comprises a second plurality of metal strips that span the second surface region; and
   the second plurality of metal strips are configured to directly contact a second plurality of contact points of a second rechargeable device when placed on the second surface region and conductively charge the second rechargeable device via the second plurality of contact points in contact with the second plurality of metal strips.

14. The charging pad of claim 13, further comprising:
   a manually operated control that permits a user to select between a boost mode of operation and a normal mode of operation;
   wherein the microcontroller is configured to deliver the first portion of the charging power to the first surface region in response to the boost mode of operation being selected via the manually operated control.

15. The charging pad of claim 13, further comprising:
   a manually operated control that permits a user to select between a boost mode of operation and a normal mode of operation;
   wherein the microcontroller is configured to deliver substantially equal portions of the charging power to the first surface region and the second surface region in response to the normal mode of operation being selected via the manually operated control.

16. The charging pad of claim 13, wherein the first portion of the charging power is a predetermined, permanent amount of the charging power.

17. The charging pad of claim 13, wherein the first surface region simultaneously charges a first rechargeable device and a second rechargeable device when placed on the first surface region.

* * * * *